United States Patent Office 3,258,363
Patented June 28, 1966

3,258,363
CARBONIZED POLYVINYLIDENECHLORIDE
FUEL CELL ELECTRODE
Harry C. Lieb, Rockville Centre, N.Y., assignor to Leesona Corporation, Cranston, R.I., a corporation of Massachusetts
No Drawing. Filed Aug. 21, 1961, Ser. No. 132,595
3 Claims. (Cl. 136—86)

This invention relates to improved porous carbon bodies and more particularly to hydrophobic carbon structures prepared by the carbonization of polyvinylidene chloride polymers. The novel carbon structures are particularly adapted for use as fuel cell electrodes.

The use of carbon electrodes in electrochemical cells for the direct production of electricity from a fuel is known. These electrodes are recognized to have noteworthy characteristics due primarily to the superior surface area available for reaction as a result of the irregular surfaces of carbon particles and to the fact that some degree of control of the porosity and surface area of the electrode can be maintained in their manufacture. The surface area is governed, at least partially, by a proper choice of petroleum coke and binding agent as well as by employing suitable gasification techniques during carbonization.

However, in spite of the numerous advantages of carbon electrodes for use in fuel cells, they have certain inherent disadvantages which render them less effective, primarily as a result of their hydrophilic characteristics. Thus, porous carbon electrodes must be wet proof for effective operation and failure of the wet proof coating results in flooding of the electrode by the electrolyte, thereby decreasing the efficiency of the cell. Many wet proofing treatments suggested by the prior art provided films which are highly unstable at higher temperatures or are slowly hydrolyzed by the electrolyte, or seriously modified by the high current densities which make fuel cells useful as a power source, resulting in flooded electrodes within several hours.

Accordingly, it is an object of the instant invention to provide a porous carbon electrode which is intrinsically hydrophobic in nature.

It is another object of the instant invention to provide a porous carbon electrode which is naturally wet proof and, thus, without need of additional wet-proofing treatment.

These and other objects of the invention will become more apparent from the following detailed description with particular emphasis on the examples.

It has been found that the carbonization of polyvinylidene chloride polymers differs from the carbonization of other polymers in that the material decomposes without producing tar, leaving only carbon as a residue. The carbonization can be illustrated by the following equation:

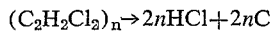

$(C_2H_2Cl_2)_n \rightarrow 2nHCl + 2nC$

This reaction is in contrast to the decomposition of other synthetic polymers which leave materials rich in hydrogen. Even after subsequent decomposition resulting in a loss of tar, major structural changes will take place with the formation of irregularly shaped lamellae, and with the residue still containing tarry aliphatic side chains. The structures obtained have surfaces which are chemically non-uniform and possess irregularly shaped pores. On the other hand, the carbonization of polyvinylidene chloride polymers provide carbon bodies which have uniform surfaces, pores of high regularity and are resistant to structural change.

In general, in the carbonization of polyvinylidene chloride polymers, the polymer in powder form is compressed at an elevated temperature and under pressure to form pellets of the desired cross section. Initial carbonization and breakdown is accomplished by heating in air at relatively low temperatures and thereafter the final stage of pyrolysis is carried out in a furnace at considerably higher temperatures in an excess of air. The resultant carbon bodies are homogeneous structures which have a high absorbtive capacity for organic vapors, even when unactivated with a catalytic metal. However, water which normally has a greater affinity for carbon structures than an organic vapor, has only a low rate of penetration. This phenomena apparently can be accounted for since water absorption is initiated at polar sites and the instant carbon surfaces, being chemically very uniform with effectively no polar sites, will not absorb water.

The novel structures of this invention are made by carbonization techniques known in the art. For low temperature carbonization, temperatures ranging from about 400–600° C. are suitable. However, since carbonization is essentially a time and temperature relationship, the temperature can be varied from as low as 200° C. up to 1350° C. and higher, depending upon the duration of the heating. Preferably, the carbonization is carried out in an inert atmosphere, as for example, in nitrogen, helium or forming gas (10% hydrogen and 90% nitrogen).

Having described the invention in general terms, Example 1 is presented as a typical illustration of the carbonization of polyvinylidene chloride polymers.

Example 1

200 grams polyvinylidene chloride polymer in powder form are compressed at 100° C. under 10 tons of pressure to form a pellet. The pellet is subjected to mild oxidation in an air oven for approximately 4½ hours at 300° C. The pyrolysis is then continued in a furnace heated at the rise rate of 5° C. per minute to 850° C. in an excess of air, the temperature being held at the ultimate range for approximately two hours. The carbon body formed is a homogeneous coherent hydrophobic structure which has a high absorptive capacity for organic vapors. When employed as the oxygen electrode in a fuel cell, the carbon body exhibited a high degree of electrochemical stability.

In the above example, as noted hereinbefore, the carbonization of the polyvinylidene chloride polymer can be performed using various modifications in the illustrative method. Thus, it is possible to employ higher temperatures for shorter periods of time in the initial oxidation step or lower temperatures can be employed using longer heating periods. Additionally, in the final pyrolysis of the structure, it is possible to vary the reaction temperature as well as time of reaction or the entire carbonization can be carried out in one operation. The compacting pressure can be varied over a substantial range. It is only necessary to employ sufficient pressure to obtain the desired pellet. Thus, the instant invention is not directed to a particular method of carbonization since such techniques are known and proper conditions are within the ability of one skilled in the art.

As another embodiment of the instant invention, the novel carbon structures are coated with an activating metal to enhance the fuel cell characteristics of the electrode. The activating process can be performed in a number of ways, such as impregnation by immersion in a bath containing a solution of the activating metal, by electrodeposition, vapor deposition or similar techniques. The proper method used and selection of activating metal depends primarily upon conditions of operation of the fuel cell as well as upon the oxidizing agent and fuel which the practitioner wishes to employ. For example, when hydrogen is to be used as the fuel, one might advantageously select palladium or nickel, whereas if the activated carbon structure is to be used as an oxidizing electrode employing oxygen as the oxidant, activation with silver would be a logical choice. The proper selection of an activating metal is within the ability of one skilled in the art, however, metals found to be particularly advantageous include palladium, platinum, nickel, cobalt, rhodium, ruthenium, iron, copper, gold, silver, cadmium, zinc, chromium and molybdenum.

Example 2 provides a typical illustration of the activation of the carbon structure of Example 1.

*Example 2*

A 2% aqueous solution of palladium nitrate is prepared and heated to a temperature of 65° C. The porous carbon plate of Example 1 is immersed in the solution and maintained for a period of 1½ hours. The impregnated carbon structure is removed from the bath and introduced into an oven at 300° C. through which a current of hydrogen gas is passed to produce a palladium activated surface upon the carbon substrate. The structure when tested as the fuel electrode in a fuel cell employing hydrogen as the fuel possesses excellent electrochemical performance characteristics.

The instant novel carbon electrodes are operable in low temperature as well as high temperature fuel cells. However, inasmuch as carbon will undergo oxidation at high temperatures, if a fuel cell is to be operated above about 200° C., the oxidizing electrode preferably should not be carbon. However, at the anode, the instant carbon electrodes can be employed in fuel cells operating at temperatures in excess of 1000° C.

Electrodes of the instant invention, since they are relatively inert to chemical reaction, can be employed with known prior art electrolytes, including aqueous alkaline hydroxides and carbonates. Virtually any ionic conductor which remains invariant under the operating conditions of the cell, can be employed.

Additionally, any of the fuels known in the prior art, such as hydrogen or the carbonaceous fuels can be employed, the proper choice depending on the fuels available, the operating temperatures of the cell and the activating metal employed to coat the electrode. The fuels employed do not form a part of the instant invention, the choice being within the ability of one skilled in the art.

While various modifications of this invention are described, it should be appreciated that the invention is not restricted thereto and the illustrations are not intended to cover all modifications of the invention which will be apparent to one skilled in the art and that come within the scope of the appended claims.

It is claimed:

1. A fuel cell for the direct production of electrical energy from a fuel and oxidant comprising a fuel electrode, an oxidant electrode, an electrolyte between said electrodes, and means for supplying a fuel and oxidant to the respective electrodes, at least one of said electrodes comprising a body of carbonized polyvinylidenechloride.

2. The fuel cell of claim 1 wherein the body of carbonized polyvinylidenechloride contains an electrochemically active metal.

3. The method of forming a body of polyvinylidenechloride, carbonizing said body to form a porous carbon structure and disposing of said porous carbon structure as an electrode in a fuel cell.

References Cited by the Examiner

UNITED STATES PATENTS

| | | | |
|---|---|---|---|
| 2,609,256 | 9/1952 | Baker et al. | 23—209.2 X |
| 2,758,940 | 8/1956 | Baker et al. | 23—209.2 X |
| 2,765,354 | 10/1956 | Carpenter et al. | 23—209.2 |
| 2,860,175 | 11/1958 | Justi | 136—86 X |
| 2,985,599 | 5/1961 | Bradley | 252—503 |
| 3,071,637 | 1/1963 | Horn et al. | 136—122 |
| 3,072,558 | 1/1963 | Myers et al. | 204—290 |
| 3,077,508 | 2/1963 | Oswin | 136—122 |
| 3,097,974 | 7/1963 | McEvoy et al. | 136—120 |
| 3,117,034 | 1/1964 | Tirrell | 136—120 |
| 3,121,050 | 2/1964 | Ford | 202—33 |

FOREIGN PATENTS 365,754   1/1932   Great Britain.

OTHER REFERENCES

Stratton et al., "Activated Carbon From Hydrocarbons and Chlorine," Industrial and Engineering Chemistry, vol. 34, No. 5, pages 603–606.

JOHN H. MACK, *Primary Examiner.*

JOSEPH REBOLD, *Examiner.*

S. PARKER, W. VAN SISE, *Assistant Examiners.*